(12) United States Patent
Lee

(10) Patent No.: US 12,530,476 B2
(45) Date of Patent: Jan. 20, 2026

(54) METHOD AND DEVICE FOR UPDATING PERSONAL INFORMATION

(71) Applicant: SAMSUNG ELECTRONICS CO., LTD., Suwon-si (KR)

(72) Inventor: Gawon Lee, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 380 days.

(21) Appl. No.: 18/094,790

(22) Filed: Jan. 9, 2023

(65) Prior Publication Data

US 2023/0185935 A1 Jun. 15, 2023

Related U.S. Application Data

(63) Continuation of application No. PCT/KR2022/014729, filed on Sep. 30, 2022.

(30) Foreign Application Priority Data

Dec. 3, 2021 (KR) .................. 10-2021-0171970
Mar. 15, 2022 (KR) .................. 10-2022-0031910

(51) Int. Cl.
*G06F 21/62* (2013.01)
*H04L 9/32* (2006.01)

(52) U.S. Cl.
CPC ...... *G06F 21/6209* (2013.01); *G06F 21/6245* (2013.01); *H04L 9/3247* (2013.01)

(58) Field of Classification Search
CPC .. G06F 21/6209; G06F 21/6245; G06F 21/60; G06F 21/62; H04L 9/3247;
(Continued)

(56) References Cited

U.S. PATENT DOCUMENTS 6,484,946 B2   11/2002   Matsumoto et al.
11,765,155 B1 *  9/2023   Srinivasan ............... G06F 8/65
                                                    713/156
(Continued)

FOREIGN PATENT DOCUMENTS

JP     2008250676 A    10/2008
KR     101096175 B1    12/2011
(Continued)

OTHER PUBLICATIONS

Abuyama Yasuao, KR 1020020001583, Machine Translation, Jan. 9, 2002 (Year: 2002).*
(Continued)

*Primary Examiner* — Luu T Pham
*Assistant Examiner* — Canh Le
(74) *Attorney, Agent, or Firm* — CANTOR COLBURN LLP

(57) ABSTRACT

A method of updating personal information stored in an electronic device, the method including determining at least one target file from a plurality of files based on a signal received from an access device to select a file to be updated. The at least one target file includes a first target file stored in a secure area and a second target file corresponding to the first target file and stored in a normal area. Further, it is determined whether to update the personal information based on authority information of the access device. Upon receiving, from the access device, an instruction to update the target file based on an update file, the first target file is updated using the update file, and the second target file is updated based on the updating of the first target file. In addition, there may be other various example embodiments.

14 Claims, 9 Drawing Sheets

(58) Field of Classification Search
CPC ... H04L 9/0891; H04L 9/3265; H04L 63/101; H04L 63/10
See application file for complete search history.

(56) References Cited

U.S. PATENT DOCUMENTS

| | | | |
|---|---|---|---|
| 2004/0117309 A1 | 6/2004 | Inoue et al. | |
| 2015/0067344 A1 | 3/2015 | Poder et al. | |
| 2015/0287031 A1* | 10/2015 | Radu | G06Q 20/204 705/18 |
| 2016/0246529 A1 | 8/2016 | Kim et al. | |
| 2017/0344738 A1 | 11/2017 | Wang | |
| 2018/0158046 A1* | 6/2018 | Choi | G06Q 20/34 |
| 2020/0275267 A1* | 8/2020 | Wang | H04L 9/3247 |
| 2021/0160081 A1 | 5/2021 | Haring et al. | |
| 2021/0258168 A1* | 8/2021 | Decoux | H04L 9/3239 |
| 2022/0141033 A1* | 5/2022 | Yaffe | H04L 9/3247 713/168 |
| 2022/0158847 A1* | 5/2022 | Aggarwal | H04W 12/069 |
| 2022/0229908 A1* | 7/2022 | Peisert | G06F 21/53 |
| 2023/0017740 A1* | 1/2023 | He | H04L 67/133 |
| 2024/0411887 A1* | 12/2024 | Nakajima | G06F 21/57 |

FOREIGN PATENT DOCUMENTS

| | | |
|---|---|---|
| KR | 20140146241 A | 12/2014 |
| KR | 101664888 B1 | 2/2016 |

OTHER PUBLICATIONS

Chai Mi et al., KR 102302097, Machine Translation, Sep. 15, 2021 (Year: 2021).*
Hashimoto Yasuhiro et al., JP 2007207137A, Machine Translation, Aug. 16, 2007 (Year: 2007).*
Shimada Kyohei, JP 2021092908A, Machine Translation, Jun. 17, 2021. (Year: 2021).*
Wada Shidefumi et al., JP 2019016131, Machine Translation,—Jan. 31, 2019 (Year: 2019).*
Yagi Yusuke, 2019057784, Machine Translation, Apr. 11, 2019 (Year: 2019).*
QuingWen Zhan, CN101465726B, Machine Translation, Oct. 19, 2011 (Year: 2011).*
Benjamin Reed et al. (Security Considerations When a Distributed File System Using Object Storage Devices, 2002, pp. 1-11. (Year: 2002).*
Keya Jiang et al. "SIMS: A Secure Information Management System for Large-Scale Dynamic Coalitions," 2001, pp. 1-9. (Year: 2001).*
International Search Report with English Translation and Written Opinion for International Application No. PCT/KR2022/014729; International Filing Date Sep. 30, 2022; Date of Mailing Jan. 9, 2023; 6 pages.

* cited by examiner

METHOD AND DEVICE FOR UPDATING PERSONAL INFORMATION

CROSS-REFERENCE TO RELATED APPLICATIONS

This application is a continuation application of International Application No. PCT/KR2022/014729 designating the United States, filed on Sep. 30, 2022, in the Korean Intellectual Property Receiving Office and claiming priority to Korean Patent Application No. 10-2022-0031910, filed on Mar. 15, 2022, and Korean Patent Application No. 10-2021-0171970, filed on Dec. 3, 2021, in the Korean Intellectual Property Office, the disclosures of which are incorporated by reference herein in their entireties.

BACKGROUND

1. Field

The disclosure relates to a method and device for updating personal information.

2. Description of Related Art

An electronic device, such as a smartphone, a tablet personal computer (PC), and the like, may include a memory, a processor, and an operating system (OS), and may execute various applications. The electronic device may store personal information in the memory. Security related to personal information is important, and can factor in allowing an application to perform functions which use the personal information stored in the memory. The electronic device may limit the application's access, for example, to a computing asset for security reasons.

SUMMARY

An identification (ID) based on a secure element integrated circuit (IC) may have a limited storage space and may thus store a limited amount of data. Accordingly, the ID based on the secure element IC may store information about a limited number of predetermined items. In addition, the ID based on the secure element IC may write new data over previous data. A data history, however, may not be trackable after overwriting the previous data with the new data.

According to example embodiments, personal information in an electronic device may be updated by appending information related to identity data to the personal information stored in the electronic device.

According to example embodiments, a personal information history may be managed by appending new data while maintaining existing personal information.

According to an example embodiment, a method of updating personal information stored in an electronic device includes determining at least one target file among a plurality of files, based on a signal, received from an access device, to select a file to be updated, in which the at least one target file includes at least one of a first target file stored in a secure area and a second target file corresponding to the first target file and stored in a normal area. The method further includes determining whether to update the personal information based on authority information of the access device. Further, the method includes receiving, from the access device, an instruction to update the at least one target file based on an update file, and updating the first target file based on the instruction. Further, the method includes updating the second target file based on the updating of the first target file.

According to another example embodiment, an electronic device includes one or more processors and a memory configured to store instructions executable by the one or more processors. The one or more processors configured to execute the instructions may be configured to determine at least one target file among a plurality of files, based on a signal, received from an access device, to select a file to be updated, in which the at least one target file includes at least one of a first target file stored in a secure area and a second target file corresponding to the first target file and stored in a normal area, determine whether to update personal information based on authority information of the access device, receive, from the access device, an instruction to update the at least one target file based on an update file, update the first target file based on the instruction, and update the second target file based on the updating of the first target file.

According to an example embodiment, a method of updating personal information may manage personal information, which is reliable and safe from being copied by an application, in an electronic device owned by an owner of the personal information.

According to an example embodiment, a method of updating personal information may provide another electronic device with personal information stored in an application even without verifying a link to a secure area.

According to an example embodiment, a method of updating personal information may verify the integrity and/or a link to an electronic device of the personal information by signing data with a signature key included in a secure area, if needed.

According to an example embodiment, a method of updating personal information may overcome a limited memory capacity of a secure area by using both an application and an applet of the secure area. Accordingly, the method may easily update data (e.g., a photo or video) of a large size.

According to an example embodiment, a method of updating personal information may manage a history of personal information.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
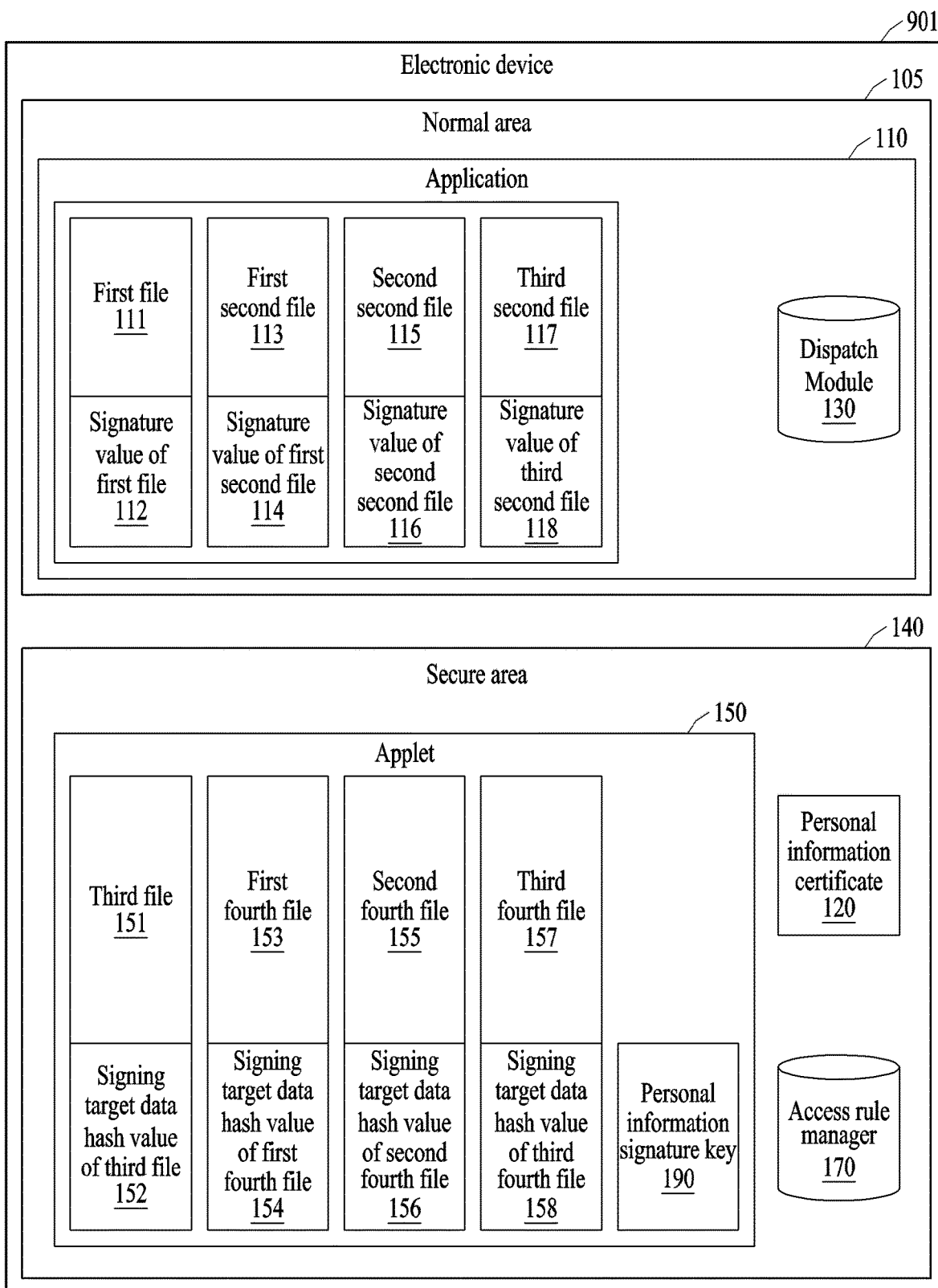
FIG. 1 is a block diagram illustrating a structure of storing personal information in an electronic device, according to an example embodiment.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, examples will be described in detail with reference to the accompanying drawings. In the drawings, like reference numerals are used for like elements.

FIG. 1 is a block diagram illustrating a structure of storing personal information in an electronic device, according to an example embodiment.

FIG. 1 illustrates a normal area 105, an application 110, a first file 111, a signature value 112 of the first file 111, a first second file 113, a signature value 114 of the first second file 113, a second second file 115, a signature value 116 of the second second file 115, a third second file 117, a signature value 118 of the third second file 117, a personal information certificate 120, a secure area 140, an applet 150, a third file 151, a signing target data hash value 152 of the third file 151, a first fourth file 153, a signing target data hash value 154 of the first fourth file 153, a second fourth file 155, a signing target data hash value 156 of the second fourth file 155, a third fourth file 157, a signing target data hash value 158 of the third fourth file 157, a personal information signature key 190, a dispatch module 130, and an access rule manager 170. Here, a "normal" area 105 is distinguished from the secure area 140 in that the normal area 105 is not subjected to the extra security measures that are applied to the secure area 140 as described herein.

An electronic device 901 may include the secure area 140. The secure area 140 may be a region for safely providing an access service based on the electronic device 901. The secure area 140 may be designed to execute an application in a manner that is protected and restricted from unauthorized access. A processor (e.g., a processor 920 of FIG. 8) may control the secure area 140 (e.g., a secure element (SE), a trusted execution environment (TEE), an embedded SE (eSE), a subscriber identification module (SIM), and an embedded SIM (eSIM)) in the electronic device 901 to store important information (e.g., a key used to establish a secure channel). An applet may be installed in the SE, and at least one instance may be generated in the applet and may store the key. The TEE may refer to a safe execution environment provided by the secure area 140 in an environment where the normal area 105 and the secure area 140 are separated from each other. A trusted application (TA) may be installed in the TEE, and at least one process (or at least one instance) may be generated in the TEE and may store the key.

The applet 150 illustrated in FIG. 1 may be the applet included in the SE or the TA included in the TEE. The applet 150 is merely an example and may include any application operable in the secure area 140. Hereinafter, the applet 150 is illustrated as an example of an application operating in the secure area 140.

The processor (e.g., the processor 920 of FIG. 8) may perform secure communication with an access device (e.g., an access device 310 of FIG. 3) by using the key stored in the secure area 140.

The application 110 may be a computer program/software stored in a memory (e.g., a memory 930 of FIG. 8) of the electronic device 901. The application 110 may include an application providing a user with a service related to personal information. The application 110 may provide the electronic device's 901 user with a service related to personal information of the user. For example, the application 110 may receive an identification (ID), in an electronic form, for identifying the user from an ID issuing organization to provide the user with the service related to the personal information of the user. The processor 920 may request the user for identity authentication (e.g., encryption-based user authentication through a personal identification number (PIN), a pattern, a password, or user authentication through biometric information, such as a fingerprint, a face, an iris, etc., or a combination thereof) through the application 110. The processor 920 may receive identity authentication information from the user and perform identity authentication. After completing the identity authentication, the processor 920 may provide the user with the personal information of the user through the application 110. For example, to provide the user with the personal information of the user, the processor 920 may output the personal information of the user on a display. In another example, the processor 920 may transform the personal information of the user and output the transformed personal information of the user (e.g., a quick response (QR) code or a barcode) on the display.

The processor 920 may connect the application 110 to an encryption key stored in the secure area 140. The processor 920 may connect the application 110 to the encryption key stored in the secure area 140 when the user receives the ID from the ID issuing organization. In this case, even when the application 110 is copied to another electronic device, the personal information of the user may not be leaked because the other electronic device may not have the encryption key connected to the application 110. In addition, even when the application 110 is copied to the other electronic device, the other electronic device may not use the application 110 to verify identity.

The applet 150 may include an application stored in the secure area 140. For example, the applet 150 may include a unit program, which is implemented by tasks, such as electronic money, a financial joint network, and/or a direct payment joint network certificate.

The applet 150 may connect to the application 110. The applet 150 may include a personal information signature key, the personal information certificate 120, personal information, and/or a signing target data hash value. The personal information signature key may include a pair of encryption keys (e.g., a personal key and a public key) for verifying that the personal information stored in the application 110 is connected to the electronic device 901. When the user receives the ID from the ID issuing organization, the processor 920 may generate a pair of personal information encryption keys through the secure area 140 and receive the personal information certificate 120 from the ID issuing organization. The personal information certificate 120 may include a certificate corresponding to the personal information signature key for verifying that the personal information is not copied from an electronic device of another user and is owned by the user of the electronic device 901. The personal information may include a plurality of files. The personal information may include a first file and at least one second file related to the first file. The signing target data hash value may include at least one piece of data to be signed by the personal information signature key. For example, the signing target data hash value 152 of the third file 151 may include a value of encoding each hash value of a plurality of sub-files included in the third file 151. The signing target data hash value may be in each file. The signing target data hash value may be in each sub-file. In an example embodiment, the processor 920 may store, in the application 110, a signature value generated by the signing target data hash value signed by the personal information signature key. In another example embodiment, the processor 920 may store, in at least one of the application 110 and the secure area 140, the signature value generated by the signing target data hash value signed by the personal information signature key.

The access rule manager 170 may include a module for controlling access to the personal information signature key. Access control may be performed in a master file (MF) stage before accessing the applet 150. An MF may be a parent file (e.g., a root file) of the applet 150 and/or files included in the secure area 140. For example, an access control protocol may include a general authentication procedure and/or an advanced inspection procedure. The access control protocol may include, for example, the BSI TR-03110 protocol, which is an electronic ID standard.

The dispatch module 130 may include a module for secure communication between the electronic device 901 and another electronic device. The processor 920, by using the dispatch module 130, may perform mutual authentication between the electronic device 901 and the access device 310, which attempts to access the secure area 140 of the electronic device 901. The processor 920, by using the dispatch module 130, may perform mutual authentication between the secure area 140 and/or the applet 150 and the access device 310. When completing the mutual authentication, the processor 920, by using the dispatch module 130, may perform secure communication between the electronic device 901 and the access device 310. A pair of asymmetric encryption keys may be stored in each of the secure area 140 of the electronic device 901 and a secure area of the access device 310. A message transmitted and received between the electronic device 901 and the access device 310 may be encrypted or decrypted through a secure channel key of a secure channel generated by using the pair of asymmetric encryption keys. The dispatch module 130 may be included either in the application 110 or in a framework other than the application 110.

A file may include a logical unit an electronic device uses to store information. The file may include a plurality of sub-files. For example, an electronic passport file may include a photo sub-file, a fingerprint sub-file, and/or a machine readable zone (MRZ) sub-file. A sub-file may be included in a subdirectory of the file in a file structure. For example, when the file is a dedicated file (DF), the sub-file may be an element file (EF). The DF may be a file including file control information and/or memory allocation, which may be a parent file of a DF or an EF. The file control information may be a response to a 'select file' instruction, which may include a usable string of data bytes. The EF may have the same file identifier as another EF and may not be a parent file of another file.

The personal information may include information that may directly or indirectly identify each person among pieces of information on persons. The personal information may include a first file and a plurality of second files, in which the first file includes information for verifying a person's identity and the plurality of second files includes information related to the first file. For example, when the first file is a file of a resident registration certificate, the second files may include at least one piece of information related to the resident registration certificate, such as a family relations file, a health insurance file, a health examination file, and/or a vaccination record file. In another example, when the first file is a file of a passport, the second files may include at least one piece of information related to the passport, such as a file of a visa issued to a user, a file of biometric information of the user, and/or a file of recording entry into and departure from a country of the user. Yet another example, when the first file is a file of a driver's license of a state where the user currently resides, the second files may include at least one of files of a driver's license obtained by the user in another state and/or country, or a learner's driver's license obtained prior to the driver's license.

The normal area 105, which is different from the secure area 140, may include an area storing the application 110. The normal area 105 may include an area to which different access control is applied than the access control applied to the secure area 140. For example, a lower level (i.e., relatively less secure) of access control may be applied to the normal area 105 than the secure area 140. The normal area 105 may include the application 110.

The application 110 and the secure area 140 may respectively have files corresponding to each other. For example, the first file 111 included in the normal area 105 may be an electronic passport file, the first second file 113 included in the normal area 105 may be a travel record file, the second second file 115 included in the normal area 105 may be a visa record file, and the third second file 117 included in the normal area 105 may be the user's biometric information file. Since the travel record file, the visa record file, and the biometric information file are all related to the electronic passport file, the processor 920 may determine that the electronic passport file is the first file and the files related to the electronic passport file are the second files. The secure area 140 may include files respectively corresponding to files stored in the normal area 105. For example, the third file 151 included in the secure area 140 may be an electronic passport file, the first fourth file 153 included in the secure area 140 may be a travel record file, the second fourth file 155 included in the secure area 140 may be a visa record file, and the third fourth file 157 included in the secure area 140 may be the user's biometric information file. The normal area 105 may have a file corresponding to a file included in the secure area 140. For example, a file stored in the secure area 140, which corresponds to a file stored in the normal area 105, may include the same data as a file stored in the application 110. In another example, the file stored in the secure area 140, which corresponds to the file stored in the normal area 105, may include at least some of the same data as the file stored in the application 110.

The file may include a plurality of sub-files. For example, when the first fourth file 153 is a travel record file, the first fourth file 153 may include a departure record sub-file and/or an entry record sub-file.

Files may refer to one another. For example, when the second second file 115 is a visa record file and the third second file 117 is a user's biometric information file, a visa issuing country sub-file included in the second second file 115 and a fingerprint sub-file included in the third second file 117 may refer to each other. By storing position information (e.g., a reference number and/or an index) of the fingerprint sub-file included in the third second file 117 in the visa issuing country sub-file included in the second second file 115, the processor 920 may allow the second second file 115 to refer to the third second file 117.

In an example embodiment, a file included in the secure area 140 may include the same data as a file included in the normal area 105. For example, data included in the first fourth file 153 in the secure area 140 may be the same as data included in the first second file 113 in the application 110. For example, the first fourth file 153 in the secure area 140 may include all the data included in the first second file 113 in the application 110. In another example embodiment, data included in the second fourth file 155 in the secure area 140 may be different from data included in the second second file 115 in the application 110. For example, there may be data stored only in the secure area 140 among pieces of data. In this case, the data may only be appended to the second fourth file 155 in the secure area 140 and may not be appended to the second second file 115 in the application 110. For example, data included in the first fourth file 153 in the secure area 140 may not be included in the first second file 113 in the application 110. Alternatively, or in addition, data included in the first second file 113 in the application 110 may not be included in the first fourth file 153 in the secure area 140. The data stored only in the secure area 140 may include data which needs access control. The processor 920 may transmit the data, after authenticating the data, from the secure area 140 to the application 110, only if necessary, and only if constraints of the secure area 140 are met.

A file may include a signature value of the file. The signature value may include a value of signing certain data by using a certain key. The signature value may include a first signature value. The first signature value may include a signature value for verifying that personal information is valid only in a certain electronic device, for example, the electronic device 901. In an example embodiment, the processor 920 may generate the first signature value by signing each file by using the personal information signature key 190 stored in the secure area 140. The signature values illustrated in FIG. 1 may each be a first signature value of each file. For example, the signature value 112 of the first file 111 may include a signature value of the first file 111 signed by the processor 920 by using the personal information signature key 190. The processor 920, by using the signature value 112 of the first file 111, may verify that the first file 111 is valid only in the certain electronic device, that is, the electronic device 901. In another example, the signature value 114 of the first second file 113 may include a signature value of the first second file 113 signed by the processor 920 by using the personal information signature key 190.

With each file including the first signature value of the file signed by using the personal information signature key 190, when some files are updated among a plurality of files, the cost and time for updating the files may be saved because only the first signature values of the files may need to be changed.

In another example embodiment, the processor 920 may sign all the plurality of files included in the normal area 105 by using the personal information signature key 190 stored in the secure area 140. In this case, there may be only one (i.e., a single) first signature value shared among the plurality of files instead of first signature values of respective files in the plurality of files. In addition, or alternatively, the personal information signature key 190 may be in each file. For example, there may be a personal information signature key signing the third file 151, a personal information signature key signing the first fourth file 153, a personal information signature key signing the second fourth file 155, and a personal information signature key signing the third fourth file 157, and the personal information signature keys may be different from one another.

Figure 2:
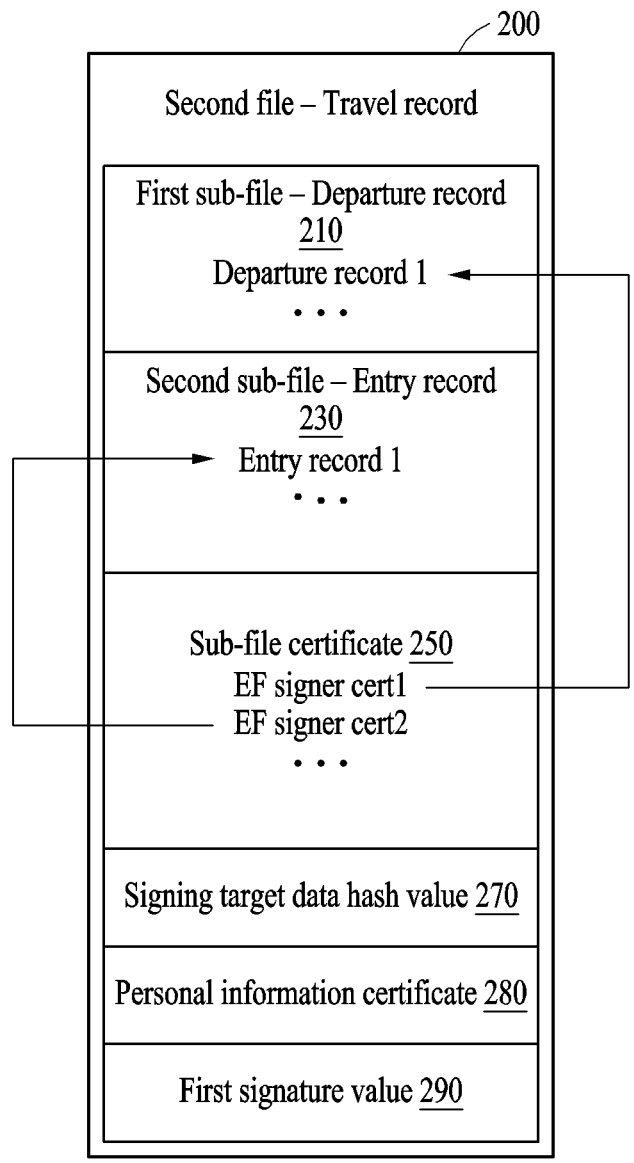
FIG. 2 is a block diagram illustrating a file structure for storing personal information, according to an example embodiment.

FIG. 2 is a block diagram illustrating a file structure for storing personal information, according to an example embodiment.

FIG. 2 illustrates a second file 200, a first sub-file 210, a second sub-file 230, a sub-file certificate 250, a signing target data hash value 270, a personal information certificate 280, and a first signature value 290. In an example embodiment, the second file 200 may include a file included in the normal area 105. In another example embodiment, the second file 200 may include a file included in the secure area 140. The file included in the secure area 140 may not include some configuration of the second file 200 or may further include another configuration.

The structure of the file included in the normal area 105 and the structure of the file included in the secure area 140 may be the same as each other. For example, as illustrated in FIG. 2, the file included in the normal area 105 and the file included in the secure area 140 may each include a plurality of sub-files, the sub-file certificate 250, the signing target data hash value 270, the personal information certificate 280, and/or the first signature value 290. The personal information certificate 280 may be in the secure area 140.

In another example embodiment, the structure of the file included in the normal area 105 and the structure of the file included in the secure area 140 may be different from each other. For example, a configuration of the file included in the normal area 105 and a configuration of the file included in the secure area 140 may be different from each other. The file included in the normal area 105 may include a plurality of sub-files, a first signature value corresponding to the file, the sub-file certificate 250, the signing target data hash value 270, and/or the personal information certificate 280. The file included in the secure area 140 may include the personal information certificate 280, a plurality of sub-files, and/or the signing target data hash value 270. As such, the structure of the file included in the normal area 105 and the structure of the file included in the secure area 140 may be different from each other.

The file may include at least one of the first signature values 290 generated by signing at least some of the file by using the personal information signature key 190, the personal information certificate 280 corresponding to the personal information signature key 190, the signing target data hash value 270, at least one sub-file (e.g., the first and second sub-files 210 and 230), and at least one sub-file certificate (e.g., the sub-file certificate 250) respectively corresponding to the at least one sub-file.

The file may include a first file and/or a second file. The first file and the second file may have the same file structure as each other or different file structures from each other. FIG. 2 illustrates the structure of the second file as an example, but the structure illustrated in FIG. 2 may be used as the structure of the first file.

The sub-file certificate 250 may include authority information on a certain sub-file (or certain data). The sub-file certificate 250 may include authority information related to the certain data. The sub-file certificate 250 may include authority information on whether the certain data is appended to the electronic device 901. The sub-file certificate 250 may include authority information for updating a target file, based on the certain data. For example, when an access device (e.g., an access device 310 of FIGS. 3A and 3B) attempts to append the certain data to the electronic device 901, whether the access device has authority of the certain data may be important. The authority of the certain data is different from authority which allows the access device 310 to access the electronic device 901 to update data. The reason is because the certain data to be appended to the electronic device 901 may not be generated by the access device 310 but by another electronic device. In this case, the authority of the certain data to be appended to the electronic device 901 may belong to the other electronic device that generated the certain data (and not to the access device 310). The access device 310 may append the certain data to the electronic device 901 only upon receiving the authority of the certain data from the other electronic device. Therefore, the processor 920 may need to verify whether the access device 310 has the authority to append the certain data, further to the authority to append data to the electronic device 901. The processor 920 may determine whether the certain data may be appended to update personal information, based on authority information included by the sub-file certificate 250.

The first sub-file 210 may include departure records, and the second sub-file 230 may include entry records. For example, the first sub-file 210 may include a first departure record and the second sub-file 230 may include a first entry record. The sub-file certificate 250 may include a sub-file certificate (e.g., the EF signer cert1 of FIG. 2) of the first departure record and a sub-file certificate (e.g., the EF signer cert2 of FIG. 2) of the first entry record.

The signing target data hash value 270 may include at least one piece of data to be signed by the personal information signature key 190. For example, the signing target data hash value 270 may include a to-be-signed (TBS) value.

The signing target data hash value 270 may be in each file (e.g., a DF). The signing target data hash value 270 may include a value of encoding a hash value of each of a plurality of sub-files included in the file. The signing target data hash value 270 may be in each sub-file (e.g., an EF).

The personal information certificate 280 may include a certificate corresponding to a personal information signature key for verifying that personal information is not copied from another electronic device and is owned by the user of the electronic device 901.

The first signature value 290 may include a signature value for verifying that the personal information is valid in the electronic device 901.

Figure 3A:
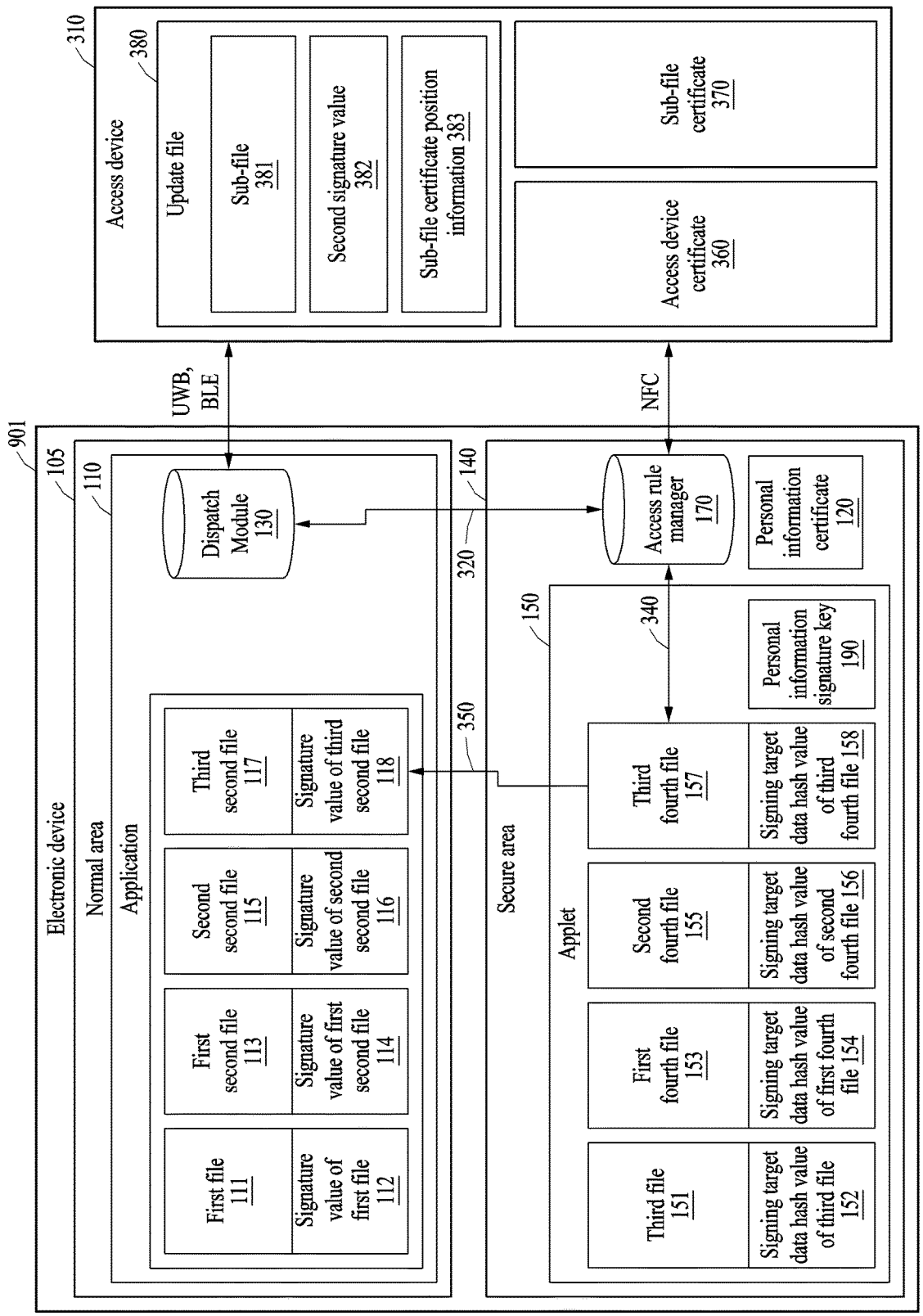
FIGS. 3A and 3B are diagrams each illustrating an update file received from an access device according to an example embodiment.
Figure 3B:
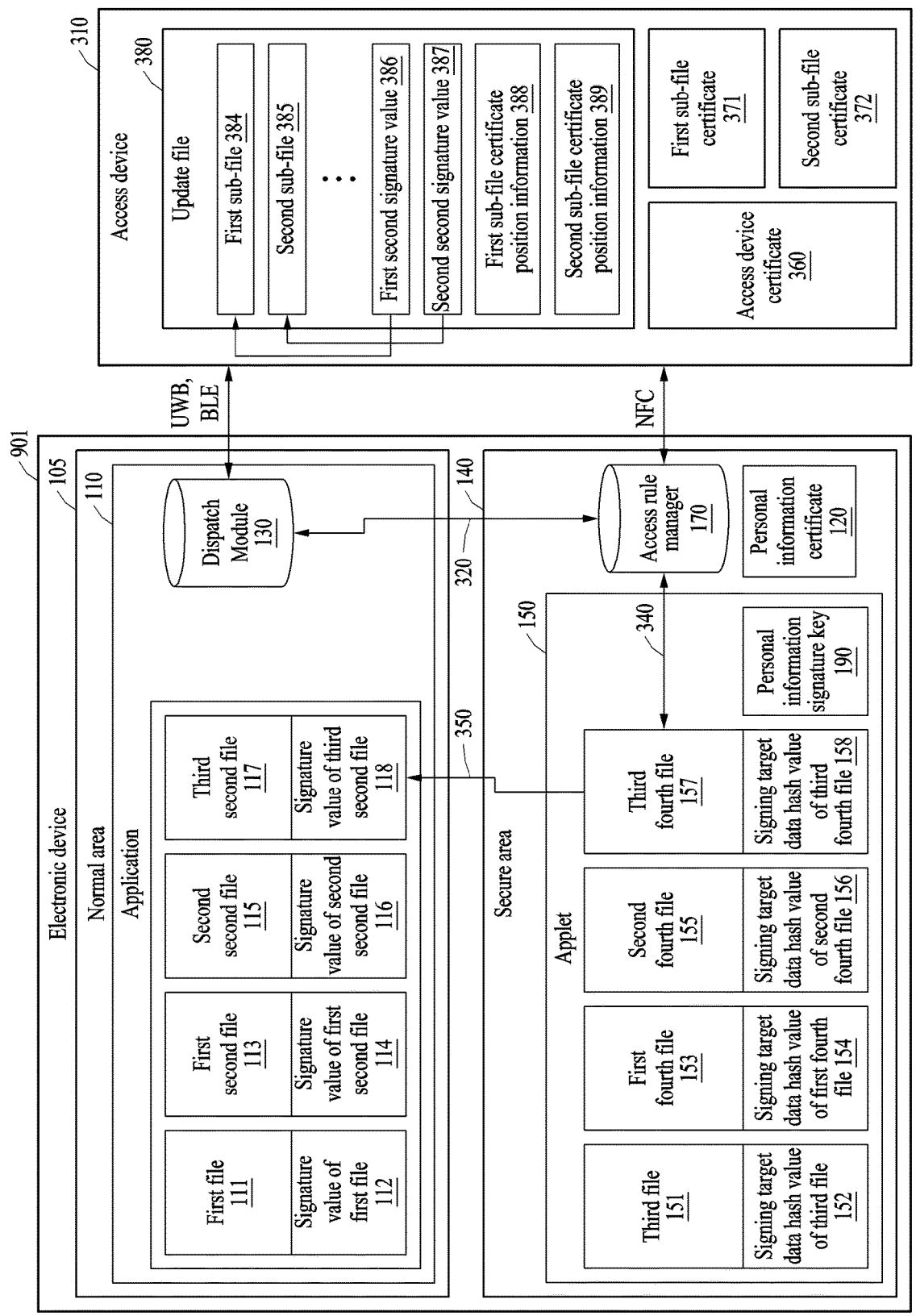

FIGS. 3A and 3B are diagrams each illustrating an update file received from an access device, according to an example embodiment.

FIG. 3A illustrates an application 110, a first file 111, a signature value 112 of the first file 111, a first second file 113, a signature value 114 of the first second file 113, a second second file 115, a signature value 116 of the second second file 115, a third second file 117, a signature value 118 of the third second file 117, a personal information certificate 120, a secure area 140, an applet 150, a third file 151, a signing target data hash value 152 of the third file 151, a first fourth file 153, a signing target data hash value 154 of the first fourth file 153, a second fourth file 155, a signing target data hash value 156 of the second fourth file 155, a third fourth file 157, a signing target data hash value 158 of the third fourth file 157, a personal information signature key 190, a dispatch module 130, an access rule manager 170, an access device 310, an update file 380, a sub-file 381, a second signature value 382, sub-file certificate position information 383, an access device certificate 360, a sub-file certificate 370, and data transmissions 320, 340, and 350.

The access device 310 may be another electronic device requesting access to the electronic device 901. The access device 310 may include at least one processor. An operation of the access device 310 may be performed by the at least one processor included in the access device 310. The access device 310 may be an electronic device for accessing the electronic device 901 and performing a certain operation (e.g., reading, writing, editing, and/or appending data) on data included in the electronic device 901. The access device 310 may recognize the secure area 140 included in the electronic device 901, read data included in the secure area 140, and update personal information. For example, the access device 310 may be an electronic device of an issuing manager of a mobile ID or mobile identity data of a government office. In the case of a mobile electronic passport, the access device 310 may be an electronic device of an immigration officer. The access device 310 may include an electronic device of a visa issuing official of an embassy of a country. The access device 310 may include a reader in a district office.

The access device 310 may include the access control certificate 360, the sub-file certificate 370, and/or the update file 380. The foregoing examples are merely examples, and the access device 310 may not include some configuration of the access device 310 or may further include another configuration.

The sub-file certificate 370 may be signed by an intermediate certification authority, and an intermediate certificate may be signed by a top-rank certification authority. The sub-file certificate 370 may be generated by an electronic device other than the access device 310. The sub-file certificate 370 may be generated by an electronic device of a data issuing organization other than the access device 310.

The data issuing organization may include, for example, at least one of a minting authority, a passport issuing office, and an immigration control office. The sub-file certificate 370 may include a sub-file signature key corresponding to the sub-file certificate 370.

The update file 380 may include a file needed to update personal information included in the electronic device 901. In an example embodiment, the update file 380 may include the sub-file 381, the second signature value 382, and/or the sub-file certificate position information 383. In another example embodiment, the update file 380 may include a plurality of sub-files, the second signature value 382, and/or the sub-file certificate position information 383. An example of the plurality of sub-files is described below in detail with reference to FIG. 3B.

The sub-file 381 included in the update file 380 may include a sub-file for updating a target file included in the electronic device 901. For example, when a user of the electronic device 901 leaves a country, a new departure record may need to be appended to the electronic device 901. In this case, the processor 920 may need to append a second departure record to the first sub-file 210 including the departure records. The sub-file 381 may include information on the second departure record. For example, the access device 310 may generate the sub-file 381 including the second departure record to append to the first sub-file 210.

The second signature value 382 may include a signature value generated by signing the sub-file 381 by using a sub-file certificate key. The sub-file certificate key may correspond to the sub-file certificate 250. The sub-file certificate 250 may include authority information on a certain sub-file (or certain data).

The access device 310 may generate the sub-file 381 included in the update file 380. The access device 310, after generating the sub-file 381, may generate the second signature value 382 by signing the sub-file 381 with the sub-file certificate key. In addition, the access device 310 may receive the sub-file certificate position information 383 (e.g., a sub-file certificate reference number) from the electronic device 901. The access device 310 may append, to the sub-file 381, the second signature value 382 and/or the sub-file certificate position information 383. In another example, the access device 310 may generate the update file 380 including the sub-file 381, the second signature value 382, and/or the sub-file certificate position information 383.

In another embodiment, the sub-file 381 included in the update file 380 may be generated by an electronic device other than the access device 310. For example, the sub-file 381 may be generated by an electronic device of a data issuing organization other than the access device 310. In this case, the access device 310 may receive the sub-file 381 from the electronic device of the data issuing organization and transmit the sub-file 381 to the electronic device 901. The electronic device of the data issuing organization may sign a newly generated sub-file 381 by using the sub-file certificate key and generate the second signature value 382. In addition, the electronic device of the data issuing organization may receive the sub-file certificate position information 383 from the electronic device 901. The electronic device of the data issuing organization may append, to the newly-generated sub-file 381, the second signature value 382 and the sub-file certificate position information 383. In another example, the electronic device of the data issuing organization may generate the update file 380 including the newly generated sub-file 381, the second signature value 382, and the sub-file certificate position information 383.

The sub-file certificate position information 383 may include position information (e.g., a reference number and/or an index) of where the sub-file certificate 370 is stored in a memory (e.g., a memory 930 of FIG. 8) in the electronic device 901. For example, the sub-file certificate position information 383 may include the reference number of the sub-file certificate 370, which refers to the sub-file certificate 370. The access device 310 may receive the sub-file certificate position information 383 from the electronic device 901.

In an example embodiment, the access device certificate 360 may include a certificate for authenticating the access device 310. The access device certificate 360 may include information on access authority of the electronic device 901. In an example embodiment, authority information may include information on authority, which allows the access device 310 or another electronic device to access the electronic device 901 and perform an operation on personal information stored in the electronic device 901. For example, the authority information may include authority information, which allows the access device 310 to establish a secure channel with the electronic device 901 and to search for, read, write, and/or append data included in the electronic device 901. In an example embodiment, the access device certificate 360 may include an access device certificate key corresponding to the access device certificate 360.

The access device certificate 360 and the sub-file certificate 370 may be the same as each other or different from each other, and examples are not limited thereto.

The access device 310 may include the access device certificate 360. The access device 310 may include the sub-file certificate 370 and the update file 380, which are generated by another electronic device (e.g., an electronic device of another data issuing organization). For example, the access device certificate 360 may be included in a reader installed in an airport or a district office, and the sub-file certificate 370 and the update file 380 may be managed by a server connected to the reader.

In an example embodiment, the electronic device 901 may use a Bluetooth-low-energy (BLE) method and/or an ultra-wideband (UWB) method for communication with the access device 310. In this case, the processor 920 of the electronic device 901 may communicate with the access device 310 by using the dispatch module 130. In addition, the processor 920 of the electronic device 901 may perform access control on the access device 310 by using the access rule manager 170. The BLE method may need a module for relaying data transmitted and received between the access device 310 and the secure area 140. The module for relaying data may include the dispatch module 130. The access device 310 and the secure area 140 may exchange data with each other through a channel encrypted with a key managed by the access rule manager 170, and accordingly, the dispatch module 130 may not intercept or change the data.

In another example embodiment, the electronic device 901 may use a near-field-communication (NFC) method for communication with the access device 310. In this case, the processor 920 of the electronic device 901 may perform access control on the access device 310 by using the access rule manager 170. The NFC method may not need a module for relaying data transmitted to or from the secure area 140, and accordingly, the access device 310 and the secure area 140 may communicate with each other through the access rule manager 170.

The example of the plurality of sub-files included in the update file 380 is illustrated in FIG. 3B.

FIG. 3B illustrates a first sub-file 384, a second sub-file 385, a first second signature value 386, a second second signature value 387, position information 388 of a first sub-file certificate 371, position information 389 of a second sub-file certificate 372, the first sub-file certificate 371, and the second sub-file certificate 372.

In an example embodiment, the access device certificate 360 may include a certificate for authenticating the access device 310. The access device certificate 360 may include information on access authority of the electronic device 901. In an example embodiment, authority information may include information on the authority, which allows the access device 310 or another electronic device to access the electronic device 901 and perform an operation on personal information stored in the electronic device 901. For example, the authority information allows the access device 310 to establish a secure channel with the electronic device 901 and to search for, read, write, and/or append data included in the electronic device 901. In an example embodiment, the access device certificate 360 may include an access device certificate key corresponding to the access device certificate 360.

In an example embodiment, the update file 380 may include the plurality of sub-files. In this case, the update file 380 may include a signature value of each of the first sub-files 384 and the second sub-files 385. For example, the update file 380 may include the first sub-file 384 and the second sub-file 385. In addition, the update file 380 may include the first second signature value 386 generated by signing the first sub-file 384 and the second second signature value 387 generated by signing the second sub-file 385. In an example embodiment, each of the sub-files may be signed by the same sub-file certificate. In another example embodiment, each of the sub-files may be signed respectively by different sub-file certificates. For example, the first sub-file 384 may be signed by the first sub-file certificate 371 and the second sub-file 385 may be signed by the second sub-file certificate 372. In this case, the update file 380 may include the position information 388 of the first sub-file certificate 371 and the position information 389 of the second sub-file certificate 372.

Figure 4:
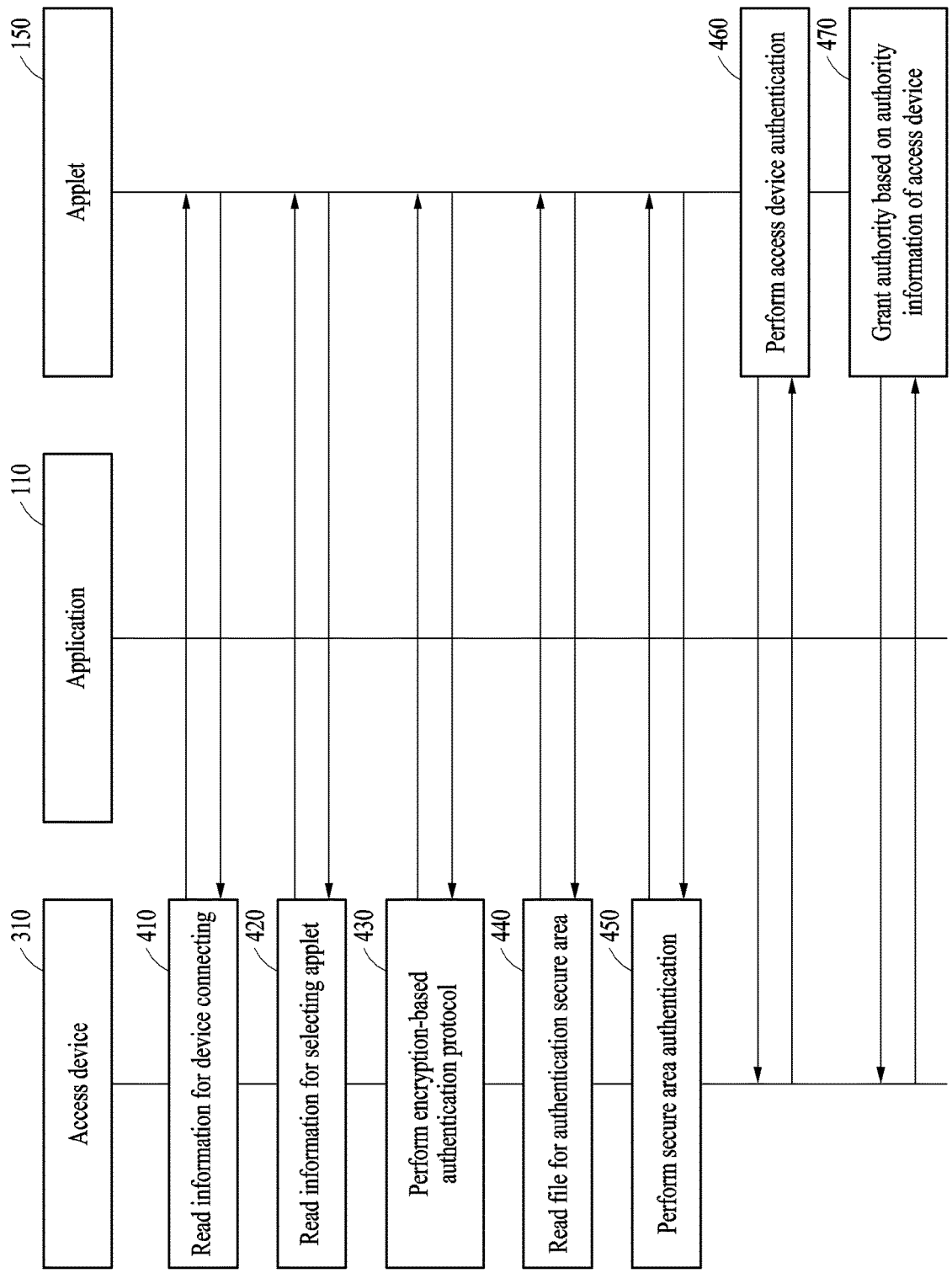
FIG. 4 is a diagram illustrating a method of authenticating an access device and a secure area of an electronic device, according to an example embodiment.

FIG. 4 is a diagram illustrating a method of authenticating an access device and a secure area of an electronic device, according to an example embodiment.

In operation 410, an access device 310 (e.g., at least one processor included in the access device 310) may read information for connecting the access device 310 to the electronic device 901. For example, the access device 310, based on an EF.CardAccess file, may obtain information for connecting the access device 310 to the electronic device 901. In an example embodiment, the EF.CardAccess file may include information on a parameter of a password authenticated connection establishment (PACE) protocol supported by an applet.

In operation 420, the access device 310 may read information for selecting an applet included in the secure area 140 of the electronic device 901. For example, the access device 310 may select the applet 150 in the electronic device 901 by reading an EF.Dir file. The EF.Dir file may include information for selecting an applet.

In operation 430, the access device 310 may perform an encryption-based authentication protocol and obtain authority for accessing the electronic device 901. The encryption-based authentication protocol may include the PACE protocol. The PACE protocol may include a protocol by using a PIN, an MRZ, and/or a card access number (CAN).

In an example embodiment, the access device 310 may access at least some data included in the electronic device 901 by performing the encryption-based authentication protocol. However, the access device 310 may not access some data included in the electronic device 901 according to a security policy. For example, according to the security policy, additional authentication may be needed for the access device 310 to access some data of high security importance.

In operation 440, the access device 310 may read a file for secure area authentication. The file for secure area authentication may include information for verifying that a secure area in which a certain applet is installed does not have a security issue. The file for secure area authentication may include information related to a secure area authentication key. For example, the file for secure area authentication may include an EF.CardSecurity file. The EF.CardSecurity file may include information related to the secure area authentication key (e.g., a chip authentication public key).

In operation 450, the access device 310 may perform secure area authentication. The secure area authentication may be performed by using a secure area authentication key stored in the secure area. The processor 920 of the electronic device 901 may transmit the secure area authentication key to the access device 310. The access device 310 may receive the secure area authentication key and perform the secure area authentication. Operation 450 may be performed simultaneously with operation 430. For example, the encryption-based authentication protocol and the secure area authentication may be performed together at the same time.

In operation 460, the electronic device 901 may perform access device authentication. The processor 920 of the electronic device 901 may authenticate the access device 310 by using an access device certificate received from the access device 310. In an example embodiment, the processor 920, based on information of a reliable certificate authority (CA) that is stored in the secure area, may verify whether the reliable CA has signed the access device certificate. In another example embodiment, the processor 920 may verify a signature by using a random challenge method and authenticate the access device 310. The random challenge method may include a method in which the processor 920 authenticates the access device 310 by transmitting a random number generated differently upon every authentication to the access device 310 and receiving a signature value based on the random number from the access device 310, and verifies the received signature value.

Operation 460 may be performed before operation 450 in some embodiments.

At least one of operations 450 and 460 may be omitted in some embodiments.

Operations 450 and 460 may both be performed for updating personal information in some embodiments.

The processor 920, based on whether the secure area and the access device 310 are authenticated, may establish a secure channel between the access device 310 and the electronic device 901. When the secure area and the access device are authenticated, the secure channel may be established. The secure channel may be a channel through which data transmitted and received between the access device 310 and the electronic device 901 is encrypted. The data transmitted and received between the access device 310 and the electronic device 901 may include data encrypted by using a session key in some embodiments.

In operation 470, the processor 920 may grant authority, based on authority information of the access device 310.

When the access device 310 is successfully authenticated, the processor 920 may verify authority granted to the access device 310, based on the authority information included in the access device certificate 360. The authority information may include authority of an operation to be performed by the access device 310 with the access device 310 accessing data included in the electronic device 901. The authority information may include at least one of search authority information, read authority information, edit authority information, and append authority information. The search authority information may include authority information that the access device 310 may search for data included in the electronic device 901. The read authority information may include authority information that the access device 310 may read the data included in the electronic device 901. The edit authority information may include authority information that the access device 310 may edit the data included in the electronic device 901. For example, the edit authority information may include authority information on overwriting. For example, when having the edit authority, the access device 310 may edit existing data based on new data. In another example, when having the edit authority, the access device 310 may overwrite the existing data with the new data. The append authority information may include authority information on appending the new data to the existing data. For example, the access device 310 may append the new data while maintaining the existing data. In this case, historic or previous information on data may be maintained.

When the access device 310 does not have authority of an operation to be performed on the electronic device 901, a procedure to perform the operation may be terminated. For example, when the access device 310 requests authentication for performing an operation of appending a new sub-file to the electronic device 901, and when the access device 310 does not have append authority, a procedure to perform the operation may be terminated.

Figure 5:
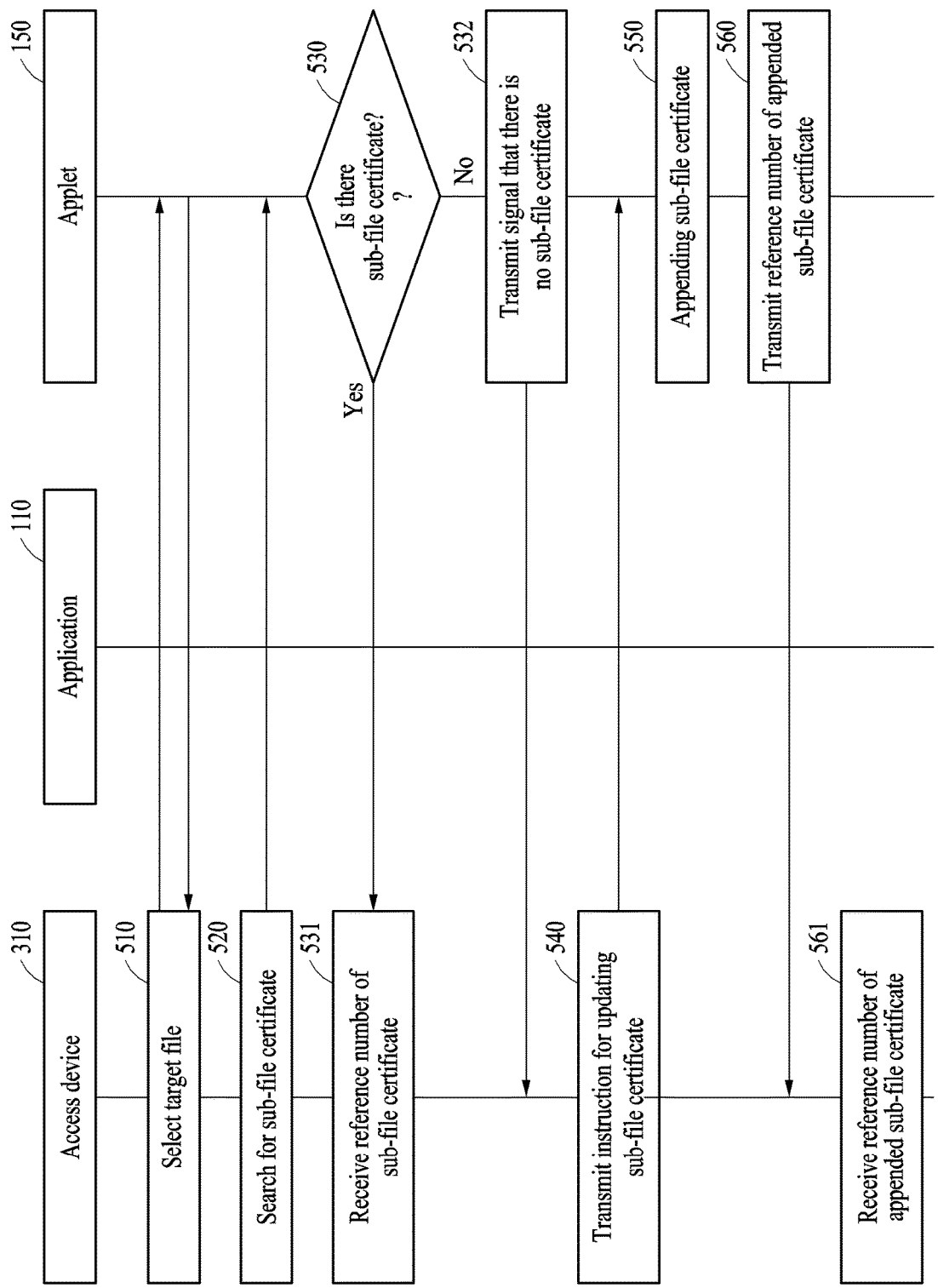
FIG. 5 is a diagram illustrating a method of obtaining a reference number of a sub-file certificate, according to an example embodiment.

FIG. 5 is a diagram illustrating a method of obtaining a reference number of a sub-file certificate, according to an example embodiment.

In operation 510, an access device 310 (e.g., a processor (not shown) included in the access device 310) may select a target file. In an example embodiment, the access device 310 may select a file to be updated as the target file from among a plurality of files included in the electronic device 901. Accordingly, the target file may include a file to be updated. The access device 310 may transmit a signal to select the target file to an applet 150. The applet 150 may transmit, to the access device 310, a response signal to the signal to select the target file.

The processor 920 may receive a signal to select the file to be updated from the access device 310. The processor 920 may determine at least one target file based on the signal to select the file.

The at least one target file may correspond to a first target file stored in a secure area and may include at least one second file stored in a normal area. For example, referring to FIG. 1, the first second file 113 may include a travel record file. The file to be updated may be the travel record file. When the travel record file is updated, the first second file 113 in an application 110 and the first fourth file 153, corresponding to the first second file 113, in the secure area may both be updated. In this case, the first second file 113 in the application 110 may be a second target file. The first fourth file 153 in the secure area may be the first target file.

In operation 520, the access device 310 may instruct the electronic device 901 to search for a sub-file certificate. The access device 310 may search whether the sub-file certificate corresponding to a sub-file included in an update file 380 is in the electronic device 901. The processor 920 may receive a search instruction for the sub-file certificate from the access device 310 and determine whether the sub-file certificate is in the electronic device 901 in operation 530. When the sub-file certificate is in the electronic device 901, in operation 531, the processor 920 may transmit a reference number of the sub-file certificate to the access device 310. The access device 310 may receive the reference number of the sub-file certificate from the electronic device 901. The access device 310 may append the reference number of the sub-file certificate to the update file 380. Referring to FIG. 2, the position information 383 of the sub-file certificate may include the reference number of the sub-file certificate that is received from the electronic device 901.

When a certain sub-file certificate is not in the electronic device 901, in operation 532, the processor 920 may transmit a signal that the sub-file certificate is not in the electronic device 901 to the access device 310. In this case, the access device 310 may transmit an instruction to update the sub-file certificate to the electronic device 901 in operation 540. In operation 550, the processor 920 may append the sub-file certificate to a certain target file, based on the instruction to update the sub-file certificate. In operation 560, the processor 920 may transmit a reference number of the appended sub-file certificate to the access device 310. In this case, the access device 310 may receive the reference number of the appended sub-file certificate from the electronic device 901 in operation 561. The access device 310 may append the reference number of the appended sub-file certificate to the update file 380. Referring to FIG. 2, the position information 383 of the sub-file certificate may include the reference number of the sub-file certificate that is received from the electronic device 901.

Figure 6:
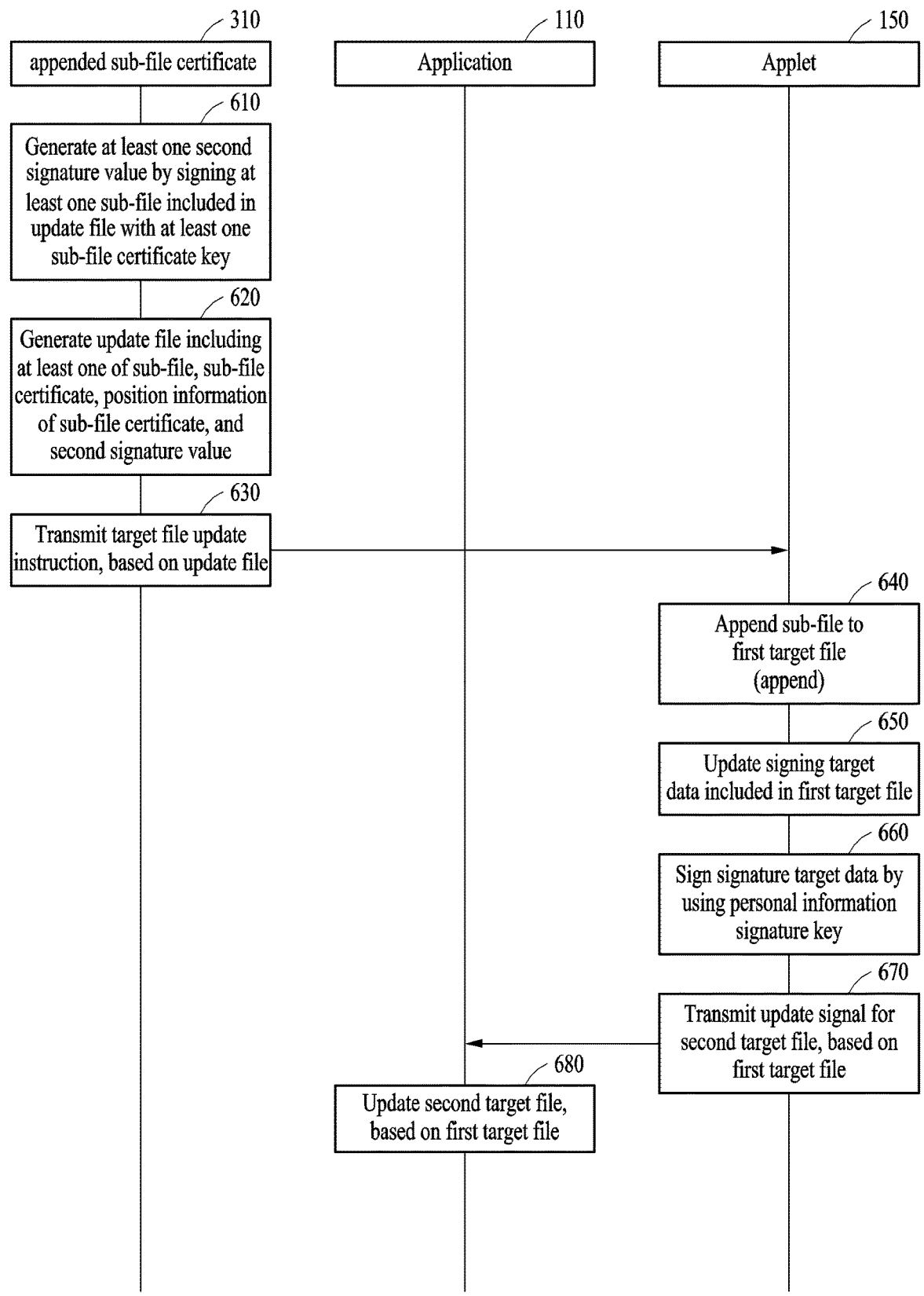
FIG. 6 is a diagram illustrating a method of updating a target file, according to an example embodiment.

FIG. 6 is a diagram illustrating a method of updating (e.g., appending) a target file, according to an example embodiment.

In operation 610, an access device 310 (e.g., a processor (not shown) of the access device 310) may generate at least one second signature value by signing at least one sub-file included in an update file with a sub-file certificate key. For example, a sub-file may include new entry records. The access device 310 and/or another data issuing device may generate the sub-file including new entry records and generate a second signature value by signing the sub-file with the sub-file certificate key.

In operation 620, the access device 310 may generate an update file including at least one of a sub-file, a sub-file certificate, the position information of the sub-file certificate, and a second signature value. In addition, the access device 310 may append the sub-file certificate, the position information of the sub-file certificate, and/or the second signature value to the sub-file.

In operation 630, the access device 310 may transmit a target file update instruction based on the update file.

The access device 310 may verify the second signature value, that is, a signature of the sub-file included in the update file, through an applet 150. When the second signature value is valid after the access device 310 has verified the second signature value through the applet 150, the access device 310 may proceed with updating personal information. However, when the second signature value is not valid, the access device 310 may halt the updating of the personal information.

The processor 920 of the electronic device 901 may verify the sub-file certificate through the applet 150. For example, a certification authority signing the sub-file certificate may be an intermediate certification authority under a top-rank certification authority. The sub-file certificate may be signed by the intermediate certification authority, and an intermediate certificate may be signed by the top-rank certification authority. Certification authorities may connect to one another as a chain from the intermediate certification authority to the top-rank certification authority. In this case, the processor 920 may perform chain verification on the sub-file certificate through the applet 150.

The processor 920 of the electronic device 901 may receive the target file update instruction. The processor 920 may update a first target file based on the target file update instruction. In operation 640, the processor 920 may append at least one sub-file to the first target file. For example, the first target file may be the first fourth file 153 in the secure area illustrated in FIG. 1. The first fourth file 153 in the secure area may include travel record information. The first fourth file 153 in the secure area may include a departure record sub-file and/or an entry record sub-file. The departure record sub-file may include a "record of leaving for the United States (US) on Oct. 2, 2020". The entry record sub-file may include a "record of entering the Republic of Korea (ROK) on Nov. 10, 2020". In this case, a departure record sub-file included in an update file may include a "record of leaving for the United Kingdom (UK) on Sep. 10, 2021" and an entry record sub-file included in the update file may include a "record of entering the ROK on Oct. 2, 2021". The processor 920, while maintaining the "record of leaving for the US on Oct. 2, 2020" in the departure record sub-file included in the first fourth file 153 in the secure area, may append the "record of leaving for the UK on Sep. 10, 2021" to the departure record sub-file included in the first fourth file 153 in the secure area. In addition, the processor 920, while maintaining the "record of entering the ROK on Nov. 10, 2020" in the entry record sub-file included in the first fourth file 153 in the secure area, may append the "record of entering the ROK on Sep. 10, 2021" in the entry record sub-file included in the first fourth file 153 in the secure area.

In operation 650, the processor 920 may update a signing target data hash value included in the first target file. For example, the first target file may be the first fourth file 153 in the secure area illustrated in FIG. 1. The first fourth file 153 in the secure area may include the travel record information. The first fourth file 153 in the secure area may include the departure record sub-file. The processor 920, while maintaining the "record of leaving for the US on Oct. 2, 2020" in the departure record sub-file included in the first fourth file 153 in the secure area, may append the "record of leaving for the UK on Sep. 10, 2021" to the departure record sub-file included in the first fourth file 153 in the secure area. An existing signing target data hash value may only have data related to the "record of leaving for the US on Oct. 2, 2020". For example, the existing signing target data hash value may include a value of encoding a hash value corresponding to the data related to the "record of leaving for the US on Oct. 2, 2020". However, the processor 920 may append data related to the "record of leaving for the UK on Sep. 10, 2021" to the signing target data hash value. In this case, the processor 920 may append a value of encoding a hash value corresponding to the "record of leaving for the UK on Sep. 10, 2021" to the signing target data hash value.

The processor 920 may encrypt at least one sub-file and append the encrypted sub-file to the signing target data hash value included in the first target file. For example, the processor 920 may append a value of encoding a hash value corresponding to the "record of leaving for the UK on Sep. 10, 2021" to the signing target data hash value.

In operation 660, the processor 920 may sign the signing target data hash value by using a personal information signature key. The processor 920, by signing the updated signing target data hash value by using the personal information signature key, may generate a third signature value. The third signature value may include a signature value for verifying that the updated personal information is valid only in a terminal corresponding to the processor 920.

In operation 670, the processor 920 may transmit an update signal for a second target file from the applet 150 to an application 110, based on the first target file. The second target file may include a file corresponding to the first target file. For example, the first target file may be included in the secure area 140 and the second target file may be included in the normal area 105. Accordingly, the second target file may include a file in the normal area 105 that corresponds to the first target file included in the secure area 140. The processor 920 may transmit information related to updating the first target file, for updating the second target file, from the applet 150 to the application 110. For example, when the first fourth file 153 in the secure area 140 is updated, the secure area 140 may transmit a signal that the first fourth file 153 is updated to the application 110. The application 110 may transmit a signal of requesting information necessary for updating the first second file 113 to the applet 150 included in the secure area 140. The secure area 140 may transmit, to the application 110, the information necessary for updating the first second file 113 in the application 110 that corresponds to the first fourth file 153 in the secure area 140.

The processor 920, through the application 110, may verify a signature value of the first target file.

In operation 680, the processor 920, through the application 110, may update the second target file based on the first target file. For example, when the first fourth file 153 in the secure area 140 is updated, the processor 920 may update the first second file 113 in the application 110 that corresponds to the first fourth file 153 in the secure area 140. In this case, the processor 920 may update the first second file 113 in the application 110, based on a sub-file appended to the first fourth file 153 in the secure area 140 and/or the third signature value corresponding to the updated first fourth file 153. Specifically, the processor 920 may update a signing target data hash value included in the first second file 110 in the application 110. When a new sub-file certificate is appended, the processor 920 may append the new sub-file certificate to the sub-file certificate 250 of FIG. 2. In addition, the processor 920 may update the first signature value included in the second target file to the third signature value. For example, the processor 920 may update the first signature value included in the first second file 113 to the third signature value.

The processor 920 may determine whether to store at least one sub-file in the secure area 140, based on a security importance of each of the at least one sub-file. Security importance may be determined for each piece of data, based on a security policy. As the security importance of data increases, the importance of access control of the data may also increase. Accordingly, the data may only be stored in the secure area 140 and a high level of access control may be applied to the data. When a sub-file included in the update file is a file stored only in the secure area 140, a sub-file corresponding to the second target file may not be appended. For example, the sub-file may be appended to the first fourth file 153 in the secure area 140 and the sub-file may not be appended to the first second file 113 in the application 110.

When at least one sub-file is stored in the normal area 105, the processor 920 may append the at least one sub-file to the second target file. The normal area 105, which is different from the secure area 140, may include an area storing the application 110. The normal area 105 may include an area to which different access control is applied from access control applied to the secure area 140. For example, a lower level of access control may be applied to the normal area 105 than the secure area 140.

Therefore, the access device 310 may access the normal area 105 relatively easier than the secure area 140 and perform various operations on data. For example, when a sub-file is appended to the first fourth file 153 in the secure area 140, the sub-file may be appended to the first second file 113 in the application 110. In another example, the sub-file may be appended to the first second file 113 in the application 110 and may not be appended to the first fourth file 153 in the secure area 140. A sub-file of relatively low security importance may not be stored in a secure area and data of high security importance may be stored in the secure area, which has a limited storage space.

Figure 7:
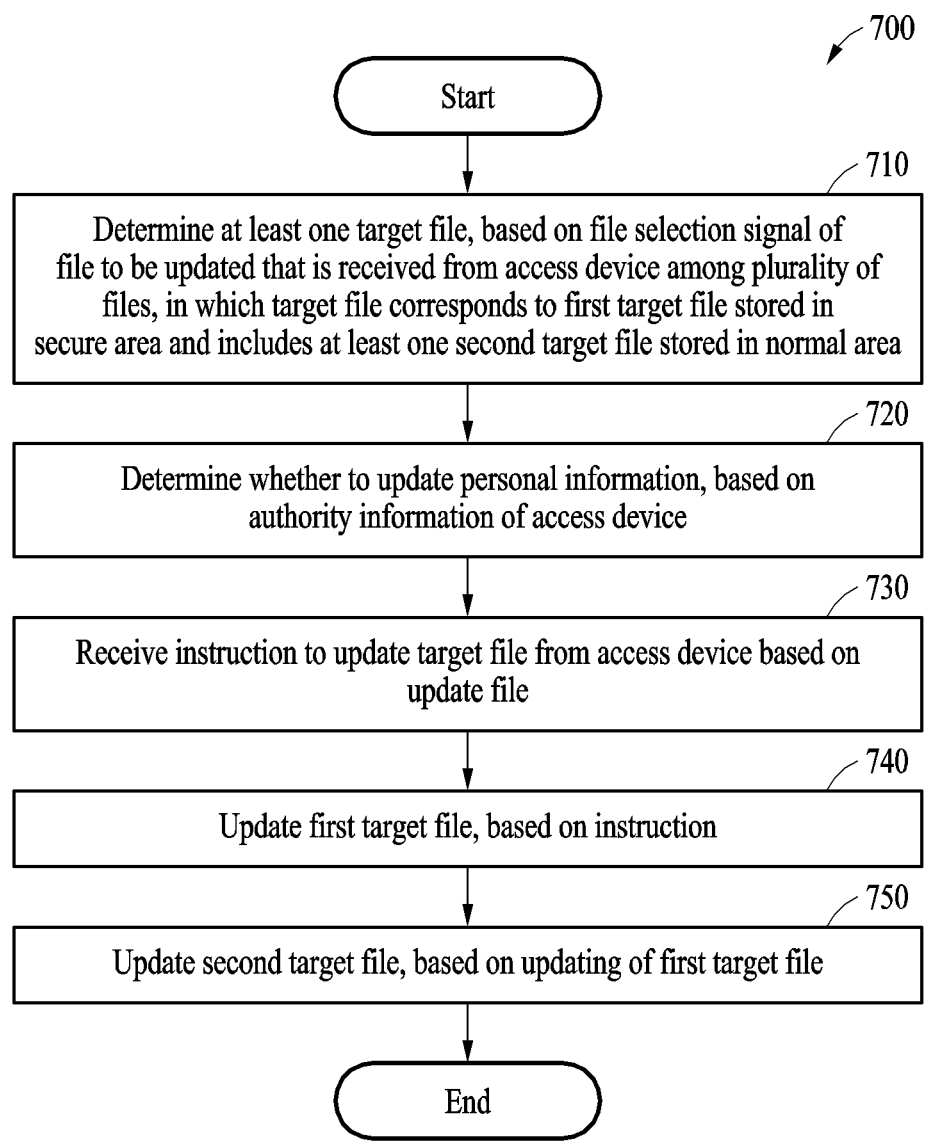
FIG. 7 is a flowchart illustrating a method of updating personal information, according to an example embodiment.

FIG. 7 is a flowchart 700 illustrating a method of updating personal information, according to an example embodiment. In the description with reference to FIG. 7, the processor 920 may be a processor included in the electronic device 901 or a processor included in the access device 310.

In a method of updating personal information stored in an electronic device, in operation 710, the processor 920 (e.g., the processor 920 of FIG. 8) may determine at least one target file among a plurality of files, based on a signal, received from an access device, to select a file to be updated, in which the target file corresponds to a first target file stored in a secure area and includes at least one second target file stored in a normal area.

In the method of updating personal information stored in an electronic device, in operation 720, the processor 920 may determine whether to update the personal information based on authority information of the access device.

In the method of updating personal information stored in an electronic device, in operation 730, the processor 920 may receive an instruction to update the target file from the access device, based on an update file.

In the method of updating personal information stored in an electronic device, in operation 740, the processor 920 may update the first target file based on the instruction.

In the method of updating personal information stored in an electronic device, in operation 750, the processor 920 may update a second target file based on the updating of the first target file.

In the method of updating personal information stored in an electronic device, a file may include a first file including information for identifying a personal identity and a plurality of second files including information related to the first file.

In the method of updating personal information stored in an electronic device, a file may include at least one of a first signature value generated by signing at least some of the file by using a personal information signature key, a personal information certificate corresponding to the personal information signature key, a signing target data hash value, at least one sub-file, and at least one sub-file certificate respectively corresponding to the at least one sub-file.

In the method of updating personal information stored in an electronic device, determining whether to update the personal information may include transmitting a secure area authentication key to the access device, authenticating the access device by using an access device certificate of the access device, and establishing a secure channel between the access device and the electronic device, based on whether the secure area and the access device are authenticated.

In the method of updating personal information stored in an electronic device, authority information may include at least one of search authority information, read authority information, edit authority information, and append authority information.

In the method of updating personal information stored in an electronic device, the method of updating personal information may further include appending a sub-file certificate to the target file, based on whether the sub-file certificate is included in the target file.

In the method of updating personal information stored in an electronic device, appending the sub-file certificate to the target file may include appending the sub-file certificate to a signing target data hash value included in the target file.

In the method of updating personal information stored in an electronic device, the update file may include at least one of at least one sub-file, at least one sub-file certificate, at least one second signature value generated by signing the at least one sub-file by respectively using the at least one sub-file certificate, and position information of the at least one sub-file certificate.

In the method of updating personal information stored in an electronic device, updating the first target file may include appending at least one sub-file to the first target file, encrypting the at least one sub-file and appending the encrypted at least one sub-file to a signing target data hash value included in the first target file, and generating a third signature value by signing the updated signing target data hash value by using a personal information certificate.

In the method of updating personal information stored in an electronic device, updating the second target file may include determining whether to store at least one sub-file in the secure area, based on a security importance of each of the at least one sub-file.

In the method of updating personal information stored in an electronic device, the updating the second target file may include appending the at least one sub-file to the second target file when the at least one sub-file is stored in the normal area.

In the method of updating personal information stored in an electronic device, the updating the second target file may include updating the first signature value included in the second target file to the third signature value.

The electronic device may include one or more processors and a memory configured to store instructions executable by the one or more processors. The one or more processors configured to execute the instructions may be configured to determine at least one target file among a plurality of files, based on a signal, received from an access device, to select a file to be updated, in which the at least one target file includes at least one of a first target file stored in a secure area and a second target file corresponding to the first target file and stored in a normal area, determine whether to update the personal information based on authority information of the access device, receive, from the access device, an instruction to update the target file based on an update file, update the first target file based on the instruction, and update the second target file based on the updating of the first target file.

The personal information may include a first file and a plurality of second files, in which the first file includes information for verifying a person's identity and the plurality of second files includes information related to the first file.

The file may include at least one of a first signature value generated by signing at least some of the file by using a personal information signature key, a personal information certificate corresponding to the personal information signature key, a signing target data hash value, at least one sub-file, and at least one sub-file certificate respectively corresponding to the at least one sub-file.

The electronic device may transmit a secure area authentication key to the access device, authenticate the access device by using an access device certificate of the access device, and establish a secure channel between the access device and the electronic device, based on whether the secure area and the access device are authenticated.

The authority information may include at least one of search authority information, read authority information, edit authority information, and append authority information.

The electronic device, based on whether the target file includes a sub-file certificate, may append the sub-file certificate to the target file.

The electronic device may append the sub-file certificate to a signing target data hash value included in the target file.

The update file may include at least one of at least one sub-file, at least one sub-file certificate, at least one second signature value generated by signing the at least one sub-file by respectively using the at least one sub-file certificate, and position information of the at least one sub-file certificate.

The electronic device may append at least one sub-file to the first target file, encrypt the at least one sub-file and append the encrypted at least one sub-file to a signing target data hash value included in the first target file, and generate a third signature value by signing the updated signing target data hash value by using a personal information certificate.

The electronic device may determine whether to store the at least one sub-file in the secure area, based on a security importance of each of the at least one sub-file.

The electronic device may append the at least one sub-file to the second target file when the at least one sub-file is stored in the normal area.

The electronic device may update a first signature value included in the second target file by using a third signature value.

Figure 8:
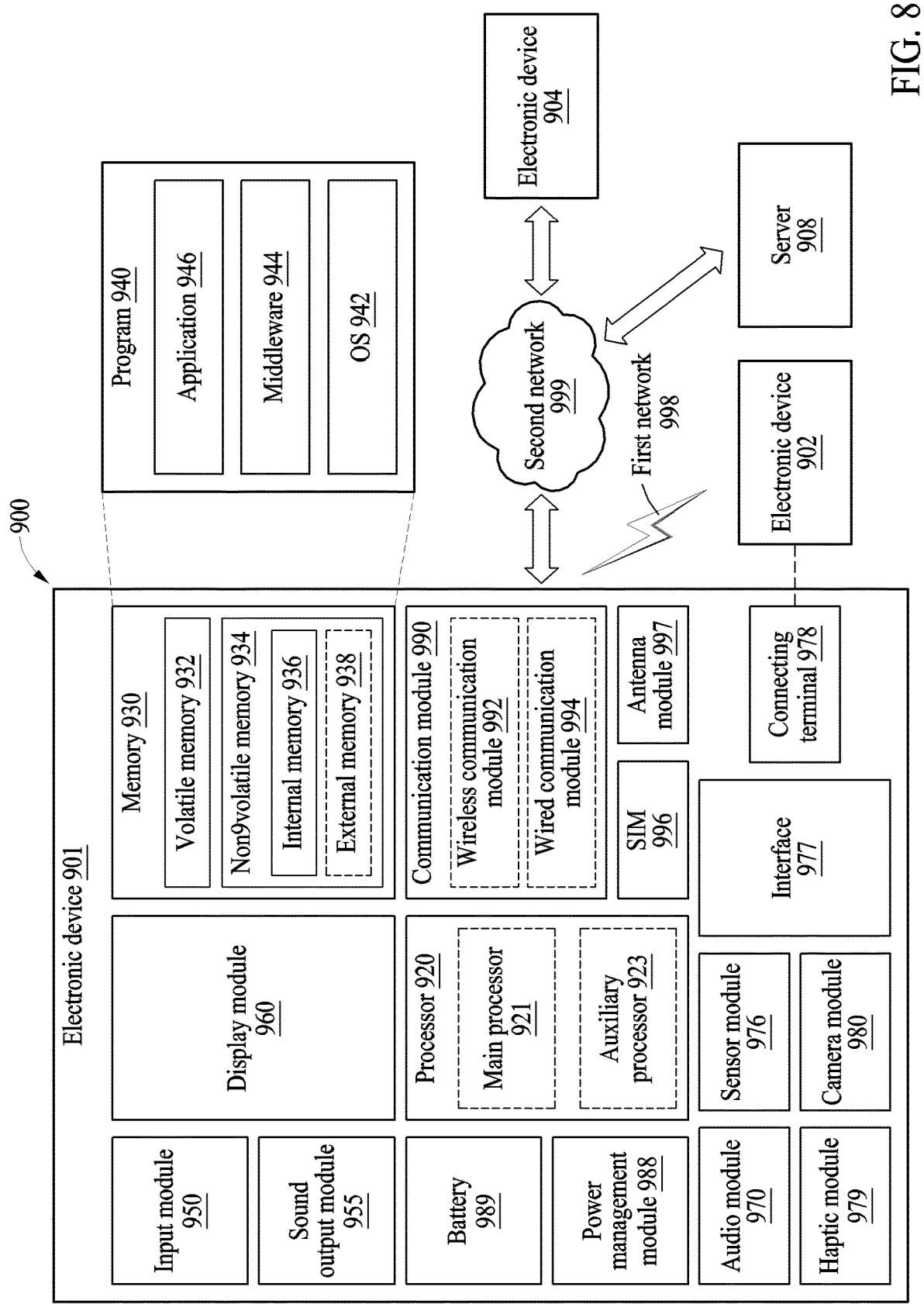
FIG. 8 is a block diagram illustrating an electronic device in a network environment according to various example embodiments.

FIG. 8 is a block diagram illustrating an electronic device in a network environment according to various example embodiments.

FIG. 8 is a block diagram illustrating an electronic device 901 in a network environment 900 according to various example embodiments. Referring to FIG. 8, the electronic device 901 in the network environment 900 may communicate with an electronic device 902 via a first network 998 (e.g., a short-range wireless communication network), or communicate with at least one of an electronic device 904 or a server 908 via a second network 999 (e.g., a long-range wireless communication network). According to an example embodiment, the electronic device 901 may communicate with the electronic device 904 via the server 908. According to an example embodiment, the electronic device 901 may include a processor 920, a memory 930, an input module 950, a sound output module 955, a display module 960, an audio module 970, and a sensor module 976, an interface 977, a connecting terminal 978, a haptic module 979, a camera module 980, a power management module 988, a battery 989, a communication module 990, an SIM 996, or an antenna module 997. In some example embodiments, at least one of the components (e.g., the connecting terminal 978) may be omitted from the electronic device 901, or one or more of other components may be added to the electronic device 901. In some example embodiments, some of the components (e.g., the sensor module 976, the camera module 980, or the antenna module 997) may be integrated as a single component (e.g., the display module 960).

The processor 920 may execute, for example, software (e.g., a program 940) to control at least one other component (e.g., a hardware or software component) of the electronic device 901 connected to the processor 920 and may perform various data processing or computation. According to an example embodiment, as at least a part of data processing or computation, the processor 920 may store a command or data received from another component (e.g., the sensor module 976 or the communication module 990) in a volatile memory 932, process the command or the data stored in the volatile memory 932, and store resulting data in a non-volatile memory 934. According to an example embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with the main processor 921. For example, when the electronic device 901 includes the main processor 921 and the auxiliary processor 923, the auxiliary processor 923 may be adapted to consume less power than the main processor 921 or to be specific to a specified function. The auxiliary processor 923 may be implemented separately from or as a part of the main processor 921. The auxiliary processor 923 may control at least some of functions or states related to at least one (e.g., the display module 960, the sensor module 976, or the communication module 990) of the components of the electronic device 901, instead of the main processor 921 while the main processor 921 is in an inactive (e.g., sleep) state or along with the main processor 921 while the main processor 921 is an active state (e.g., executing an application). According to an example embodiment, the auxiliary processor 923 (e.g., an ISP or a CP) may be implemented as a portion of another component (e.g., the camera module 980 or the communication module 990) that is functionally related to the auxiliary processor 923. According to an example embodiment, the auxiliary processor 923 (e.g., an NPU) may include a hardware structure specified for artificial intelligence model processing. An artificial intelligence model may be generated by machine learning. Such learning may be performed by, for example, the electronic device 901 in which artificial intelligence is performed, or performed via a separate server (e.g., the server 908). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored as software in the memory 930, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output a sound signal to the outside of the electronic device 901. The sound output module 955 may include, for example, a speaker or a receiver. The speaker may be used for general purposes, such as playing multimedia or playing a record. The receiver may be used to receive an incoming call. According to an example embodiment, the receiver may be implemented separately from the speaker or as a part of the speaker.

The display module 960 may visually provide information to the outside (e.g., a user) of the electronic device 901. The display module 960 may include, for example, a control circuit for controlling a display, a hologram device, or a projector and control circuitry to control a corresponding one of the display, the hologram device, and the projector. According to an example embodiment, the display module 960 may include a touch sensor adapted to detect a touch, or a pressure sensor adapted to measure the intensity of force incurred by the touch.

The audio module 970 may convert a sound into an electric signal or vice versa. According to an example embodiment, the audio module 970 may obtain the sound via the input module 950 or output the sound via the sound output module 955 or an external electronic device (e.g., the electronic device 902 such as a speaker or a headphone) directly or wirelessly connected to the electronic device 901.

The sensor module 976 may detect an operational state (e.g., power or temperature) of the electronic device 901 or an environmental state (e.g., a state of a user) external to the electronic device 901 and generate an electrical signal or data value corresponding to the detected state. According to an example embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more of specified protocols to be used for the electronic device 901 to be coupled with the external electronic device (e.g., the electronic device 902) directly (e.g., wired) or wirelessly. According to an example embodiment, the interface 977 may include, for example, a high-definition multimedia interface (HDMI), a universal serial bus (USB) interface, a secure digital (SD) card interface, or an audio interface.

The connecting terminal 978 may include a connector via which the electronic device 901 may be physically connected to an external electronic device (e.g., the electronic device 902). According to an example embodiment, the connecting terminal 978 may include, for example, an HDMI connector, a USB connector, an SD card connector, or an audio connector (e.g., a headphone connector).

The haptic module 979 may convert an electric signal into a mechanical stimulus (e.g., a vibration or a movement) or an electrical stimulus which may be recognized by a user via his or her tactile sensation or kinesthetic sensation. According to an example embodiment, the haptic module 979 may include, for example, a motor, a piezoelectric element, or an electric stimulator.

The camera module 980 may capture a still image and moving images. According to an example embodiment, the camera module 980 may include one or more of lenses, image sensors, image signal processors, or flashes.

The power management module 988 may manage power supplied to the electronic device 901. According to an example embodiment, the power management module 988 may be implemented as, for example, at least a part of a power management integrated circuit (PMIC).

The battery 989 may supply power to at least one component of the electronic device 901. According to an example embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more of communication processors that are operable independently of the processor 920 (e.g., an AP) and that support a direct (e.g., wired) communication or a wireless communication. According to an example embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module, or a power line communication (PLC) module). A corresponding one of these communication modules may communicate with the external electronic device 904 via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the SIM 996.

The wireless communication module 992 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., a mmWave band) to achieve, e.g., a high data transmission rate. The wireless communication module 992 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 992 may support various requirements specified in the electronic device 901, an external electronic device (e.g., the electronic device 904), or a network system (e.g., the second network 999). According to an example embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an example embodiment, the antenna module 997 may include an antenna including a radiating element including a conductive material or a conductive pattern formed in or on a substrate (e.g., a printed circuit board (PCB)). According to an example embodiment, the antenna module 997 may include a plurality of antennas (e.g., array antennas). In such a case, at least one antenna appropriate for a communication scheme used in a communication network, such as the first network 998 or the second network 999, may be selected by, for example, the communication module 990 from the plurality of antennas. The signal or the power may be transmitted or received between the communication module 990 and the external electronic device via the at least one selected antenna. According to an example embodiment, another component (e.g., a radio frequency integrated circuit (RFIC)) other than the radiating element may be additionally formed as a part of the antenna module 997.

According to various example embodiments, the antenna module 997 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 901 and the external electronic device 904 via the server 908 coupled with the second network 999. Each of the external electronic devices 902 or 904 may be a device of the same type as or a different type from the electronic device 901. According to an example embodiment, all, or some of operations to be executed by the electronic device 901 may be executed at one or more of external electronic devices (e.g., the external devices 902 and 904, and the server 908). For example, if the electronic device 901 needs to perform a function or a service automatically, or in response to a request from a user or another device, the electronic device 901, instead of, or in addition to, executing the function or the service, may request one or more of external electronic devices to perform at least part of the function or the service. The one or more of external electronic devices receiving the request may perform the at least part of the function or the service requested, or an additional function or an additional service related to the request and may transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In an example embodiment, the external electronic device 904 may include an Internet-of-things (IoT) device. The server 908 may be an intelligent server using machine learning and/or a neural network. According to an example embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

What is claimed is:

1. A method of updating personal information stored in an electronic device, wherein the personal information comprises a plurality of files, the method comprising:
   determining at least one target file from the plurality of files, based on a signal received from an access device to select a file to be updated, wherein the at least one target file comprises a first target file stored in a secure area and a second target file corresponding to the first target file and stored in a normal area, wherein the first target file comprises a signing target data hash value; and
   updating the personal information, the updating comprising:
      updating the first target file based on an update file comprising at least one sub-file received from the access device, wherein updating the first target file comprises:
         appending the least one sub-file to the first target file;
         generating an updated signing target data hash value by appending a hash value of the at least one sub-file to the signing target data hash value; and
         generating another signature value by signing the updated signing target data hash value with a personal information signature key; and
      updating the second target file based on the updating of the first target file
   wherein the updating the personal information comprises:
      transmitting a secure area authentication key to the access device to authenticate the secure area;
      authenticating the access device by using an access device authentication key of the access device; and
      based on whether the secure area and the access device are authenticated, establishing a secure channel between the access device and the electronic device.

2. The method of claim 1, wherein
the plurality of files in the personal information comprises:
a first file comprising information for identifying a personal identity and a plurality of second files comprising information related to the first file.

3. The method of claim 2, wherein
a second file comprises:
at least one of a first signature value generated by signing at least some of the file by using a personal information signature key, a personal information certificate corresponding to the personal information signature key, another signing target data hash value, at least one second sub-file, and at least one sub-file certificate respectively corresponding to the at least one second sub-file.

4. The method of claim 1, further comprising:
authorizing the access device based on authority information of the access device, wherein the authority information comprises at least one of search authority information, read authority information, edit authority information, and append authority information.

5. The method of claim 1, further comprising:
based on the first target file comprising a sub-file certificate, appending the sub-file certificate to the first target file.

6. The method of claim 5, wherein
the appending the sub-file certificate to the first target file comprises:
appending the sub-file certificate to the signing target data hash value comprised in the first target file.

7. The method of claim 1, wherein
the update file further comprises:
at least one of at least one sub-file certificate, at least one second signature value generated by signing the at least one sub-file by respectively using the at least one sub-file certificate, and position information of the at least one sub-file certificate.

8. The method of claim 1, wherein
the updating the first target file further comprises:
encrypting the at least one sub-file to generate the hash value of the at least one sub-file.

9. The method of claim 1, wherein
the updating the second target file comprises:
storing at least one sub-file in the secure area based on a security importance of each of the at least one sub-file.

10. The method of claim 9, wherein
the updating the second target file further comprises:
storing at least one sub-file in the normal area based on the security importance of each of the at least one sub-file by appending the at least one sub-file to the second target file.

11. The method of claim 1, wherein
the updating the second target file comprises:
updating a first signature value comprised in the second target file by using another signature value.

12. An electronic device comprising:
one or more processors; and
memory storing instructions that, when executed by the one or more processors individually or collectively, cause the electronic device to:
identify at least one target file among a plurality of files to be updated based on a request from an access device to update personal information, wherein the at least one target file comprises a first target file stored in a secure area and a second target file, which corresponds to the first target file, and is stored in a normal area, wherein the first target file comprises a signing target data hash value, and
update the personal information by
updating the first target file based on an update file comprising at least one sub-file received from the access device, wherein updating the first target file comprises:
appending the at least one sub-file to the first target file;
generating an updated signing target data hash value by appending a hash value of the at least one sub-file to the signing target data hash value; and
generating another signature value by signing the updated signing target data hash value with a personal information signature key; and
updating the second target file based on the updating of the first target file;
wherein the updating the personal information comprises:
transmitting a secure area authentication key to the access device to authenticate the secure area;
authenticating the access device by using an access device authentication key of the access device; and
based on whether the secure area and the access device are authenticated, establishing a secure channel between the access device and the electronic device.

13. A non-transitory computer-readable storage medium storing instructions that, when executed by a processor, cause the processor to perform the method of claim 1.

14. An electronic device comprising:
one or more processors; and
at least one memory comprising a first area and a second area, wherein the memory stores instructions that, when executed by the one or more processors individually or collectively, cause the electronic device to:
based on a request to update personal information stored on the electronic device, identify at least one target file from a plurality of files to be updated, the at least one target file comprising a first file stored in the first area, and a second file stored in the second area, wherein the second file comprises a signing target data hash value;
update the second file in the second area using an update file comprising at least one sub-file from the access device, wherein updating the second file comprises:
appending the at least one sub-file to the second file;
generating an updated signing target data hash value by appending a hash value of the at least one sub-file to the signing target data hash value; and
generating another signature value by signing the updated signing target data hash value with a personal information signature key; and
update the first file based on the updating of the second file;
wherein updating the personal information comprises:
transmitting a secure area authentication key to the access device to authenticate the secure area;
authenticating the access device by using an access device authentication key of the access device; and
based on whether the secure area and the access device are authenticated, establishing a secure channel between the access device and the electronic device.

* * * * *